United States Patent
Tian et al.

(10) Patent No.: US 11,221,716 B2
(45) Date of Patent: Jan. 11, 2022

(54) TOUCH SUBSTRATE AND TOUCH DISPLAY APPARATUS WITH TOUCH ELECTRODES HAVING ZIGZAG BOUNDARIES

(71) Applicants: BOE Technology Group Co., Ltd., Beijing (CN); Hefei Xinsheng Optoelectronics Technology Co., Ltd., Anhui (CN)

(72) Inventors: Jian Tian, Beijing (CN); Tsungchieh Kuo, Beijing (CN); Ming Zhang, Beijing (CN); Xujie Zhang, Beijing (CN); Shifeng Xu, Beijing (CN); Chunjian Liu, Beijing (CN); Jing Wang, Beijing (CN); Xinbin Tian, Beijing (CN)

(73) Assignees: BOE TECHNOLOGY GROUP CO., LTD., Beijing (CN); Hefei Xinsheng Optoelectionics Technology Co., Ltd., Anhui (CN)

( * ) Notice: Subject to any disclaimer, the term of this patent is extended or adjusted under 35 U.S.C. 154(b) by 613 days.

(21) Appl. No.: 16/300,199

(22) PCT Filed: Nov. 9, 2017

(86) PCT No.: PCT/CN2017/110163
§ 371 (c)(1),
(2) Date: Nov. 9, 2018

(87) PCT Pub. No.: WO2019/090585
PCT Pub. Date: May 16, 2019

(65) Prior Publication Data
US 2021/0271344 A1    Sep. 2, 2021

(51) Int. Cl.
*G06F 3/044*    (2006.01)
*G06F 3/041*    (2006.01)

(52) U.S. Cl.
CPC .......... *G06F 3/0445* (2019.05); *G06F 3/0412* (2013.01); *G06F 3/0446* (2019.05); *G06F 2203/04111* (2013.01)

(58) Field of Classification Search
CPC .... G06F 3/0445; G06F 3/0412; G06F 3/0446; G06F 2203/0411
See application file for complete search history.

(56) References Cited

U.S. PATENT DOCUMENTS

2009/0213090 A1    8/2009  Mamba et al.
2010/0328268 A1*  12/2010  Teranishi .............. G06F 3/0412
                                                                    345/175
(Continued)

FOREIGN PATENT DOCUMENTS

CN    103384870 A    11/2013
CN    103927031 A    7/2014
(Continued)

OTHER PUBLICATIONS

International Search Report & Written Opinion dated Jul. 25, 2018, regarding PCT/CN2017/110163.

(Continued)

*Primary Examiner* — Liliana Cerullo
(74) *Attorney, Agent, or Firm* — Intellectual Valley Law, P.C.

(57) ABSTRACT

The present application discloses a touch substrate. The touch substrate includes a first touch electrode layer including a plurality of first touch electrodes successively along a first direction, each of the plurality of first touch electrodes extending substantially along a second direction; a second touch electrode layer including a plurality of second touch electrodes successively along the second direction, each of the plurality of second touch electrodes extending substantially along the first direction; and a plurality of dummy (Continued)

patterns electrically insulated from the first touch electrode layer.

19 Claims, 10 Drawing Sheets

(56) References Cited

U.S. PATENT DOCUMENTS

| | | | |
|---|---|---|---|
| 2012/0044165 A1 | 2/2012 | Kwak et al. | |
| 2014/0054070 A1 | 2/2014 | Ichiki | |
| 2014/0098057 A1* | 4/2014 | Lee | G06F 3/0446 |
| | | | 345/174 |
| 2014/0184939 A1 | 7/2014 | Lai et al. | |
| 2014/0192010 A1 | 7/2014 | Lai et al. | |
| 2014/0299361 A1* | 10/2014 | Nakamura | H05K 1/0296 |
| | | | 174/253 |
| 2015/0227243 A1 | 8/2015 | Wang et al. | |
| 2016/0195983 A1* | 7/2016 | Miyake | G06F 3/0446 |
| | | | 345/174 |
| 2016/0259447 A1 | 9/2016 | Lin et al. | |
| 2016/0291749 A1 | 10/2016 | Zhou et al. | |
| 2017/0108975 A1 | 4/2017 | Zhang et al. | |
| 2017/0147133 A1 | 5/2017 | Choi | |
| 2017/0160830 A1 | 6/2017 | Lee | |
| 2017/0199594 A1 | 7/2017 | Lee et al. | |
| 2018/0059843 A1* | 3/2018 | Kim | G06F 3/0446 |
| 2018/0284921 A1 | 10/2018 | Nakase et al. | |

FOREIGN PATENT DOCUMENTS

| | | |
|---|---|---|
| CN | 104834396 A | 8/2015 |
| CN | 106155388 A | 11/2016 |
| CN | 106970724 A | 7/2017 |
| JP | 2009205321 A | 9/2009 |
| JP | 2018169844 A | 11/2018 |

OTHER PUBLICATIONS

First Office Action in the Indian Patent Application No. 201837044779, dated Feb. 17, 2021.

The Extended European Search Report in the European Patent Application No. 17913113.1, dated May 31, 2021.

First Office Action in the Japanese Patent Application No. 2018563686, dated May 25, 2021; English translation attached.

* cited by examiner

TOUCH SUBSTRATE AND TOUCH DISPLAY APPARATUS WITH TOUCH ELECTRODES HAVING ZIGZAG BOUNDARIES

CROSS-REFERENCE TO RELATED APPLICATION

This application is a national stage application under 35 U.S.C. § 371 of International Application No. PCT/CN2017/110163, filed Nov. 09, 2017, the contents of which are incorporated by reference in the entirety.

TECHNICAL FIELD

The present invention relates to touch control technology, more particularly, to a touch substrate and a touch control display apparatus.

BACKGROUND

In recent years, touch devices have been widely used in many electronic devices such as mobile phones, computer display panels, touch screens, satellite navigation devices, digital cameras, etc. Examples of touch devices include a mutual-capacitance touch control device and a self-capacitance touch control device. In a mutual-capacitance touch control device, the touch electrodes include multiple touch scanning electrodes (Tx) and multiple touch sensing electrodes (Rx). In a self-capacitance touch control device, the touch electrode can achieve touch control function alone. When a finger touches a point on the touch control display panel, the capacitor of the finger superimposes on the touch panel capacitor, resulting in a change in the capacitance of the touch panel capacitor. Based on the capacitance change upon a touch event, the coordinates of the first electrode and the second electrode being touched may be determined. In detecting touch events, the mutual capacitive touch display panel examines the touch scanning electrode array and the touch sensing electrode array sequentially. Touch resolution correlates with the distance between adjacent conductive channels. A smaller distance between adjacent conductive channels results in a higher touch resolution.

SUMMARY

In one aspect, the present invention provides a touch substrate comprising a first touch electrode layer comprising a plurality of first touch electrodes successively along a first direction, each of the plurality of first touch electrodes extending substantially along a second direction; a second touch electrode layer comprising a plurality of second touch electrodes successively along the second direction, each of the plurality of second touch electrodes extending substantially along the first direction; and a plurality of dummy patterns electrically insulated from the first touch electrode layer; wherein each of the plurality of first touch electrodes comprises a plurality of first electrode blocks electrically connected substantially along the second direction; each of the plurality of second touch electrodes comprises a plurality of second electrode blocks electrically connected substantially along the first direction; each of the plurality of first touch electrode blocks has a first zigzag boundary having a plurality of rising edges and a plurality of falling edges; and each of the plurality of first touch electrode blocks and adjacent dummy patterns of the plurality of dummy patterns form a substantially parallelogram shape.

Optionally, an interior angle of the parallelogram shape is in a range of approximately 60 degrees to approximately 90 degrees.

Optionally, each of the plurality of second touch electrodes has a substantially parallelogram shape.

Optionally, each of the plurality of second touch electrode blocks has a second zigzag boundary having a plurality of rising edges and a plurality of falling edges; and each of the plurality of second touch electrode blocks and adjacent dummy patterns of the plurality of dummy patterns form a substantially parallelogram shape.

Optionally, the plurality of dummy patterns comprises a plurality of first dummy patterns, each of which being in an area sandwiched between a pair of one of the plurality of first electrode blocks and one of the plurality of second electrode blocks, the one of the plurality of first electrode blocks and the one of the plurality of second electrode blocks adjacent to each other.

Optionally, one or more of the plurality of first dummy patterns occupies between approximately 50% to approximately 75% of a length of a side in each of at least one of four sides of the substantially parallelogram shape.

Optionally, a width of each of the plurality of first dummy patterns along a width direction between the pair of the one of the plurality of first electrode blocks and the one of the plurality of second electrode blocks is no more than approximately 25% of a length of a side of the substantially parallelogram shape substantially parallel to the width direction.

Optionally, multiple dummy patterns of the plurality of first dummy patterns occupying a first side of the substantially parallelogram shape comprise a first layer of dummy patterns and a second layer of dummy patterns; the first layer of dummy patterns extends along the first side of the substantially parallelogram shape for a first length; and the second layer of dummy patterns is adjacent to the first layer of dummy patterns and is spaced apart from the first side of the substantially parallelogram shape by the first layer of dummy patterns, the second layer of dummy patterns extends along the first layer of dummy patterns for a second length.

Optionally, a first ratio of the first length to a length of the first side is substantially the same as a second ratio of the second length to the first length.

Optionally, the plurality of dummy patterns further comprises a plurality of second dummy patterns, each of which being in an area surrounded by one of the plurality of first electrode blocks.

Optionally, the plurality of dummy patterns further comprises a plurality of third dummy patterns, each of which being in an area surrounded by one of the plurality of second electrode blocks.

Optionally, an included angle between each of substantially all edges of the first zigzag boundary and the first direction is in a range of approximately 15 degrees to approximately 75 degrees; and an included angle between each of substantially all edges of the first zigzag boundary and the second direction is in a range of approximately 15 degrees to approximately 75 degrees.

Optionally, an included angle between any two adjacent edges of substantially all edges of a boundary of each of the plurality of dummy patterns is in a range of approximately 30 degrees to approximately 150 degrees.

Optionally, an included angle between each of substantially all edges of the boundary of each of the plurality of dummy patterns and the first direction is in a range of approximately 15 degrees to approximately 75 degrees; and an included angle between each of substantially all edges of the boundary of each of the plurality of dummy patterns and the second direction is in a range of approximately 15 degrees to approximately 75 degrees.

Optionally, a ratio between a total area of the plurality of dummy patterns and a total area of touch electrodes in the touch substrate is in a range of approximately 1:10 to approximately 1:2.

Optionally, multiple second dummy patterns of the plurality of second dummy patterns surrounded by a single one of the plurality of first electrode blocks have a substantially mirror symmetry with respect to an axis of mirror symmetry substantially along the second direction.

Optionally, the single one of the plurality of first electrode block has a substantially mirror symmetry with respect to the axis of mirror symmetry.

Optionally, an included angle between any two adjacent edges of substantially all edges of the second zigzag boundary is in a range of approximately 30 degrees to approximately 150 degrees.

Optionally, an included angle between each of substantially all edges of the second zigzag boundary and the first direction is in a range of approximately 15 degrees to approximately 75 degrees; and an included angle between each of substantially all edges of the second zigzag boundary and the second direction is in a range of approximately 15 degrees to approximately 75 degrees.

In another aspect, the present invention provides a touch control display apparatus, comprising the touch substrate described herein or fabricated by a method described herein; and an array of a plurality of subpixels in a matrix substantially along the first direction and the second direction.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
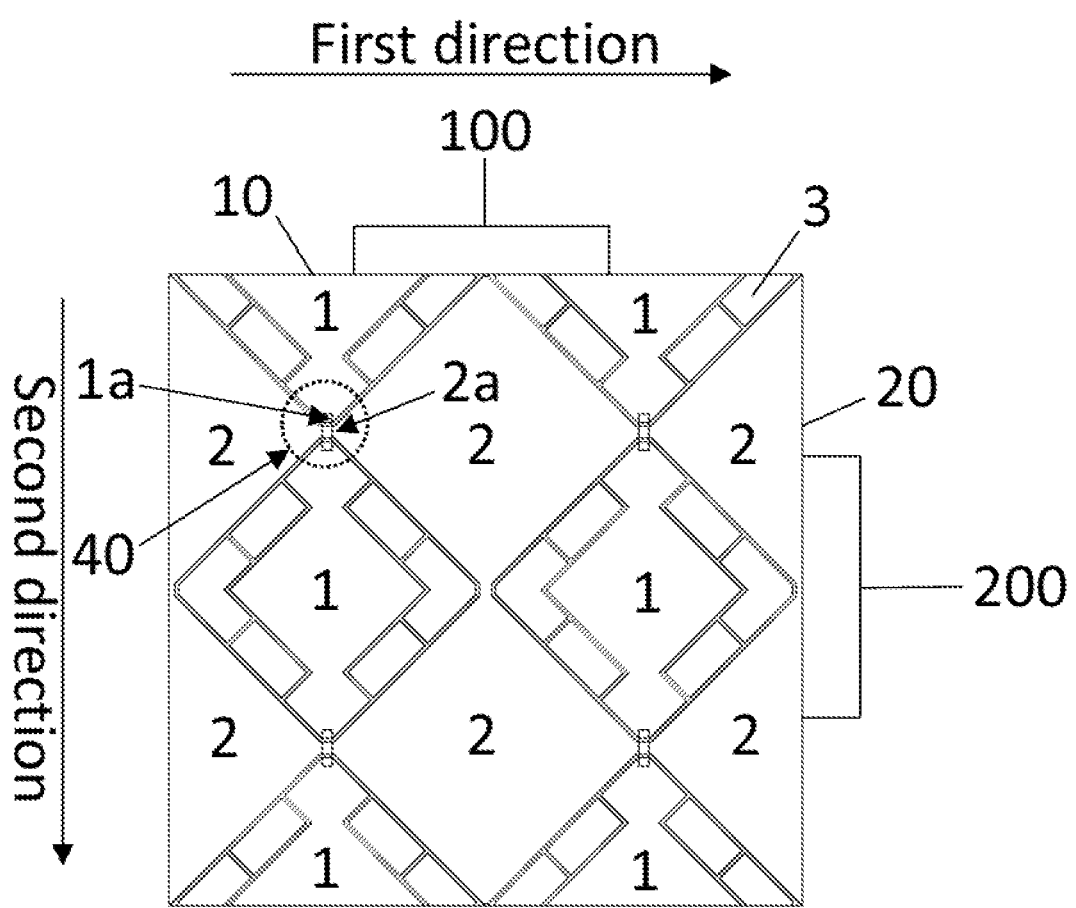
FIG. 1 is a diagram illustrating a touch substrate in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional touch control display apparatuses, touch detection in the touch electrode layer is affected by an interference from the display module (e.g., a liquid crystal display module), resulting in decreased touch sensitivity and accuracy. To protect the touch detection from the display module, the conventional touch control display apparatus is made to have a smaller area of touch electrodes, for example, by including dummy electrode blocks in the touch substrate. The touch electrode blocks in the conventional touch control display apparatus typically have a rod shape, and have long, repeating, linear stretches of horizontal or vertical boundaries, leading to interference with the display module and Moiré patterns.

Accordingly, the present disclosure provides, inter alia, a touch substrate and a touch control display apparatus that substantially obviate one or more of the problems due to limitations and disadvantages of the related art. In one aspect, the present disclosure provides a touch substrate. In some embodiments, the touch substrate includes a first touch electrode layer having a plurality of first touch electrodes successively along a first direction, each of the plurality of first touch electrodes extending substantially along a second direction; a second touch electrode layer including a plurality of second touch electrodes successively along the second direction, each of the plurality of second touch electrodes extending substantially along the first direction; and a plurality of dummy patterns electrically insulated from the first touch electrode layer. Optionally, each of the plurality of first touch electrodes includes a plurality of first electrode blocks electrically connected substantially along the second direction; and each of the plurality of second touch electrodes includes a plurality of second electrode blocks electrically connected substantially along the first direction. Optionally, each of the plurality of first touch electrode blocks has a first zigzag boundary having a plurality of rising edges and a plurality of falling edges. Optionally, each of the plurality of first touch electrode blocks and adjacent dummy patterns of the plurality of dummy patterns form a substantially parallelogram shape. Optionally, an included angle between any two adjacent edges of substantially all edges of the first zigzag boundary is in a range of approximately 30 degrees to approximately 150 degrees.

As used herein, the term "dummy pattern" refers to a pattern that is not employed for passing a touch signal. Optionally, a dummy pattern is floating. Optionally, a dummy pattern is provided between adjacent touch electrode blocks. The dummy pattern is used to fill the gap between patterns of adjacent touch electrode blocks. The dummy pattern may be formed so as to prevent the region(s) where adjacent touch electrode blocks and the gap therebetween from being differently recognized. Optionally, the dummy pattern is in a floating state in which the dummy pattern is not connected to any of the touch electrode blocks.

As used herein, the term "a substantially parallelogram shape" generally refers to a quadrilateral shape with two pairs of parallel sides. The term substantially parallelogram in the context of the present disclosure is not limited to a perfect parallelogram in a strict sense as used in mathematics, but also includes shapes approximating a parallelogram, for example, a parallelogram having small deviations from the perfect parallelogram shape. Optionally, a substantially parallelogram shape includes a parallelogram with one or more non-straight boundary lines, a parallelogram with one or more small protrusions in the boundary, a parallelogram with one or more small recess in the boundary, a parallelogram with one or more edges having some nominal degree of curvature, a parallelogram with a partially convex side, a parallelogram with a side projecting along an area, a parallelogram with one or more flattened or blunted or rounded or chamfered corners, and so forth. Optionally, an interior angle between the two sides of the parallelogram is in a range of approximately 60 degrees to approximately 90 degrees, e.g., approximately 60 degrees to approximately 89 degrees, approximately 60 degrees to approximately 80 degrees, approximately 70 degrees to approximately 90 degrees, approximately 70 degrees to approximately 80 degrees. Optionally, none of the interior angles of the parallelogram is 90 degrees. Optionally, the substantially parallelogram shape is a rectangular or a square. Optionally, the substantially parallelogram shape is a parallelogram other than a rectangular and a square.

As used herein, the term "substantially all edges" means at least 80%, at least 85%, at least 90%, at least 95%, at least 96%, at least 97%, at least 98%, at least 99%, at least 99.5%, or at least 99.9% of edges.

FIG. 1 is a diagram illustrating a touch substrate in some embodiments according to the present disclosure. Referring to FIG. 1, the touch substrate in some embodiments includes a first touch electrode layer having a plurality of first touch electrodes 10 arranged successively along a first direction. Each of the plurality of first touch electrodes 10 extends substantially along a second direction. The touch substrate further includes a plurality of dummy patterns 3 electrically insulated from the first touch electrode layer. Each of the plurality of first touch electrode 10 includes a plurality of first touch electrode blocks 1 electrically connected substantially along the second direction. In the present touch substrate, each of the plurality of first touch electrode blocks 1 has a first zigzag boundary having a plurality of rising edges and a plurality of falling edges.

Figure 2:
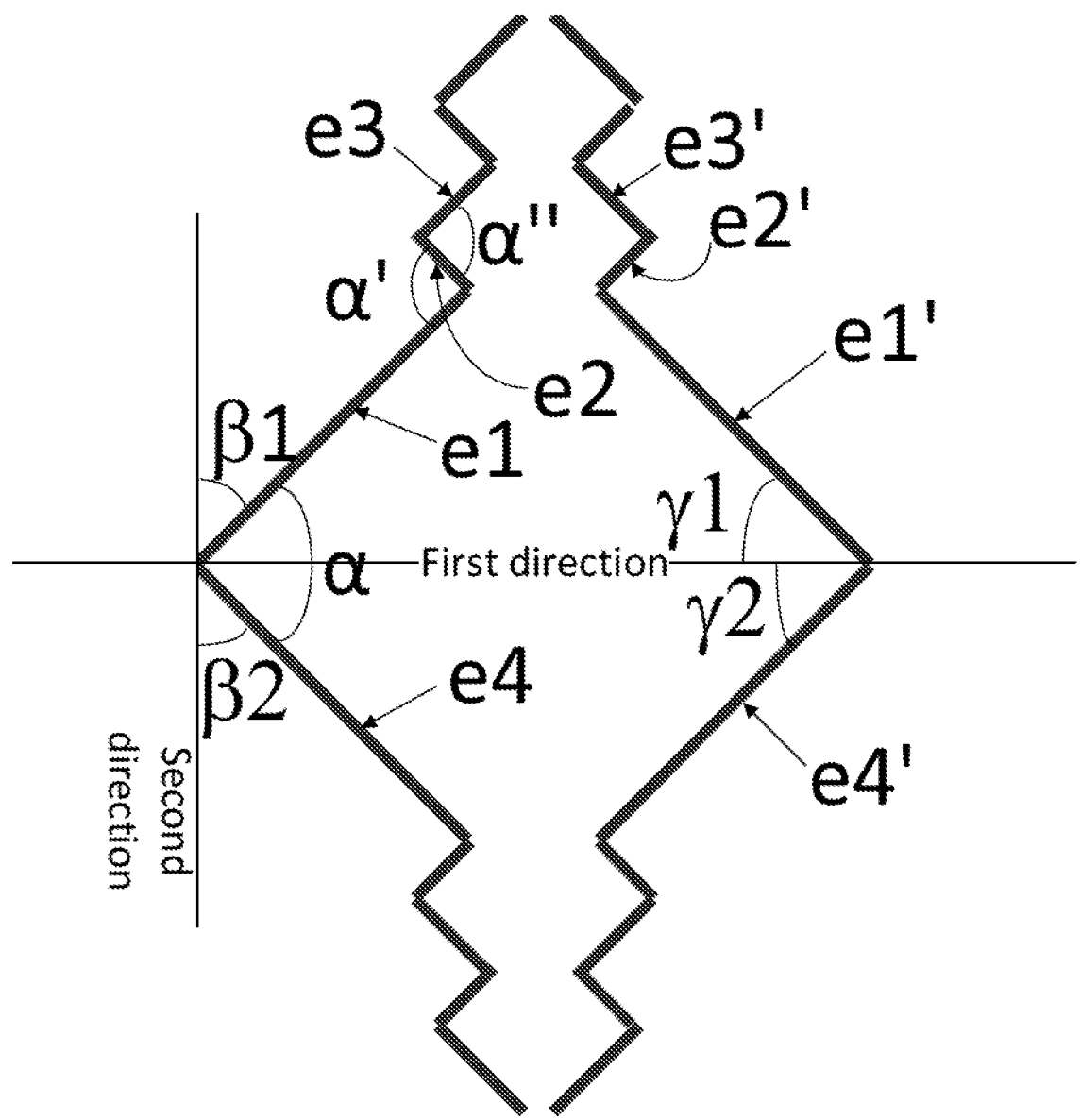
FIG. 2 is a diagram illustrating a boundary of a touch electrode block in a touch substrate in some embodiments according to the present disclosure.

In some embodiments, an included angle between any two adjacent edges of substantially all edges of the first zigzag boundary is in a range of approximately 30 degrees to approximately 150 degrees. FIG. 2 is a diagram illustrating a boundary of a touch electrode block in a touch substrate in some embodiments according to the present disclosure. Referring to FIG. 2, a first touch electrode block has a zigzag boundary including a plurality of rising edges (e.g., edges e2 and e1') and a plurality of falling edges (e.g., edges e3 and e1). For example, an included angle between any two adjacent edges of substantially all edges of the first zigzag boundary is in a range of approximately 30 degrees to approximately 150 degrees. For example, each of an included angle α between edges e1 and e1', an included angle α' between edges e1 and e2, and an included angle α" between edges e2 and e3, is an angle between approximately 30 degrees and approximately 150 degrees.

Optionally, the included angle between any two adjacent edges of substantially all edges of the first zigzag boundary is in a range of approximately 50 degrees to approximately 130 degrees. Optionally, the included angle between any two adjacent edges of substantially all edges of the first zigzag boundary is in a range of approximately 60 degrees to approximately 120 degrees. Optionally, the included angle between any two adjacent edges of substantially all edges of the first zigzag boundary is in a range of approximately 70 degrees to approximately 110 degrees. Optionally, the included angle between any two adjacent edges of substantially all edges of the first zigzag boundary is in a range of approximately 80 degrees to approximately 100 degrees. Optionally, the included angle between any two adjacent edges of substantially all edges of the first zigzag boundary is in a range of approximately 85 degrees to approximately 95 degrees. Optionally, the included angle between any two adjacent edges of substantially all edges of the first zigzag boundary is substantially 90 degrees.

In some embodiments, an included angle between each of substantially all edges of the first zigzag boundary and the first direction is in a range of approximately 15 degrees to approximately 75 degrees; and an included angle between each of substantially all edges of the first zigzag boundary and the second direction is in a range of approximately 15 degrees to approximately 75 degrees. Referring to FIG. 2, an included angle γ1 between edge e1' and the first direction is between approximately 15 degrees to approximately 75 degrees, an included angle γ2 between edge e4' and the first direction is between approximately 15 degrees to approximately 75 degrees, an included angle β1 between edge e1 and the second direction is between approximately 15 degrees to approximately 75 degrees, and an included angle β2 between edge e4 and the second direction is between approximately 15 degrees to approximately 75 degrees.

Optionally, the included angle between each of substantially all edges of the first zigzag boundary and the first direction is in a range of approximately 25 degrees to approximately 65 degrees; and the included angle between each of substantially all edges of the first zigzag boundary and the second direction is in a range of approximately 25 degrees to approximately 65 degrees. Optionally, the included angle between each of substantially all edges of the first zigzag boundary and the first direction is in a range of approximately 30 degrees to approximately 60 degrees; and the included angle between each of substantially all edges of the first zigzag boundary and the second direction is in a range of approximately 30 degrees to approximately 60 degrees. Optionally, the included angle between each of substantially all edges of the first zigzag boundary and the first direction is in a range of approximately 35 degrees to approximately 55 degrees; and the included angle between each of substantially all edges of the first zigzag boundary and the second direction is in a range of approximately 35 degrees to approximately 55 degrees. Optionally, the included angle between each of substantially all edges of the first zigzag boundary and the first direction is in a range of approximately 40 degrees to approximately 50 degrees; and the included angle between each of substantially all edges of the first zigzag boundary and the second direction is in a range of approximately 40 degrees to approximately 50 degrees. Optionally, the included angle between each of substantially all edges of the first zigzag boundary and the first direction is in a range of approximately 42.5 degrees to approximately 47.5 degrees; and the included angle between each of substantially all edges of the first zigzag boundary and the second direction is in a range of approximately 42.5 degrees to approximately 47.5 degrees. Optionally, the included angle between each of substantially all edges of the first zigzag boundary and the first direction is substantially 45 degrees; and the included angle between each of substantially all edges of the first zigzag boundary and the second direction is approximately 45 degrees.

In some embodiment, the touch substrate further includes a black matrix layer having a plurality of black matrices substantially along a third direction and a plurality of black matrices substantially along a fourth direction. Optionally, the first direction is substantially parallel to the third direction, and the second direction is substantially parallel to the fourth direction.

In some embodiments, the touch substrate is a touch substrate in a display apparatus having an array of a plurality of subpixels arranged in an array substantially along a third direction and a fourth direction. Optionally, the first direction is substantially parallel to the third direction, and the second direction is substantially parallel to the fourth direction.

Optionally, the first touch electrode layer is a touch sensing electrode layer. Optionally, the first touch electrode layer is a touch scanning electrode layer.

Optionally, the touch substrate is a self-capacitive type touch substrate including the first touch electrode layer. Optionally, the touch substrate is a mutual-capacitive type touch substrate including the first touch electrode layer and a second touch electrode layer.

By having the included angle between any two adjacent edges of substantially all edges of the first zigzag boundary in the range of approximately 30 degrees to approximately 150 degrees, the included angle between each of substantially all edges of the first zigzag boundary and the first direction in the range of approximately 15 degrees to approximately 75 degrees, and the included angle between each of substantially all edges of the first zigzag boundary and the second direction in the range of approximately 15 degrees to approximately 75 degrees, interference between the touch electrode pattern and the pattern of a plurality of subpixels in a display apparatus having the touch substrate can be significantly reduced, obviating the interference with the display module and the Moiré pattern.

Figure 3:
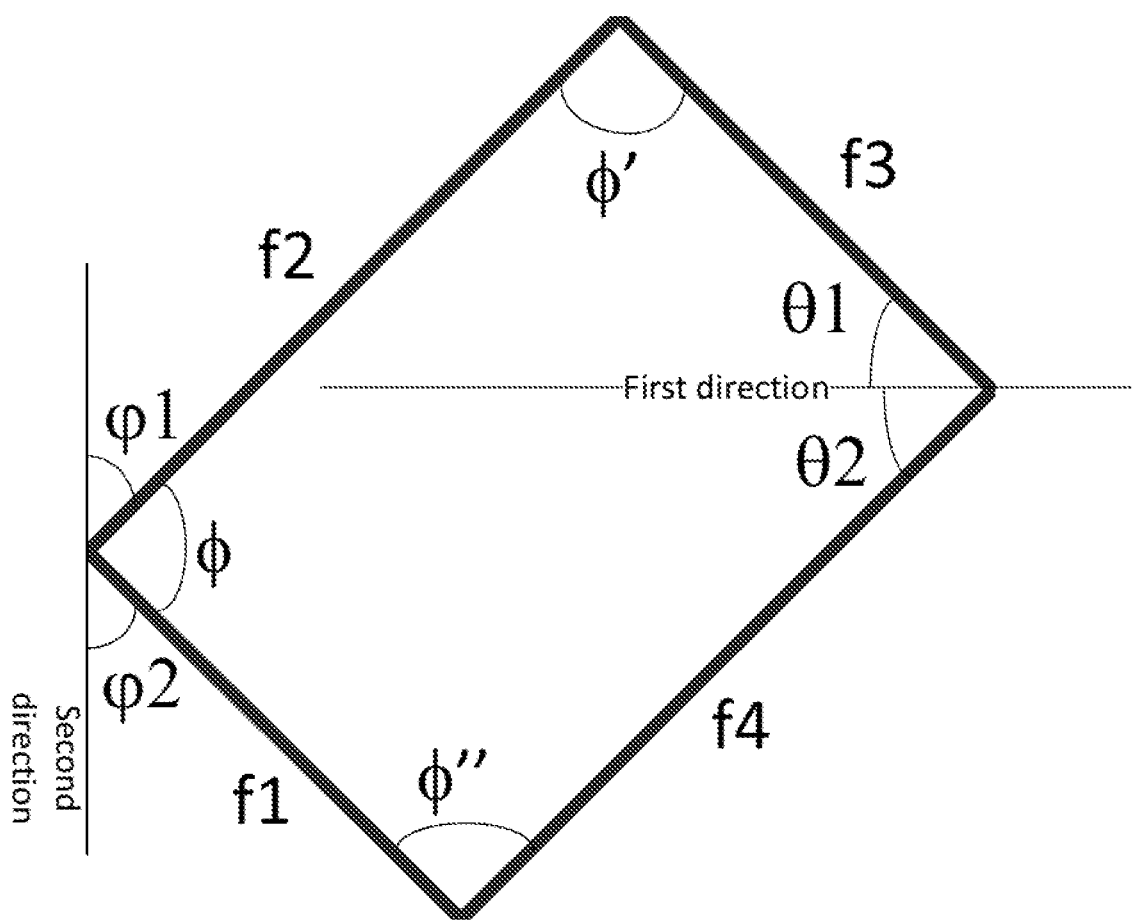
FIG. 3 is a diagram illustrating a dummy pattern in some embodiments according to the present disclosure.

In some embodiments, an included angle between any two adjacent edges of substantially all edges of a boundary of each of the plurality of dummy patterns is in a range of approximately 30 degrees to approximately 150 degrees. FIG. 3 is a diagram illustrating a dummy pattern in some embodiments according to the present disclosure. The dummy pattern includes a plurality of edges, e.g., edges f1, f2, f3, and f4. For example, referring to FIG. 3, each of an included angle $\phi$ between edges f1 and f2, an included angle $\phi'$ between edges f2 and f3, an included angle $\phi''$ between edges f1 and f4, and an included angle between edges f3 and f4, is an angle between approximately 30 degrees and approximately 150 degrees.

Optionally, the included angle between any two adjacent edges of substantially all edges of a boundary of each of the plurality of dummy patterns is in a range of approximately 50 degrees to approximately 130 degrees. Optionally, the included angle between any two adjacent edges of substantially all edges of a boundary of each of the plurality of dummy patterns is in a range of approximately 60 degrees to approximately 120 degrees. Optionally, the included angle between any two adjacent edges of substantially all edges of a boundary of each of the plurality of dummy patterns is in a range of approximately 70 degrees to approximately 110 degrees. Optionally, the included angle between any two adjacent edges of substantially all edges of a boundary of each of the plurality of dummy patterns is in a range of approximately 80 degrees to approximately 100 degrees. Optionally, the included angle between any two adjacent edges of substantially all edges of a boundary of each of the plurality of dummy patterns is in a range of approximately 85 degrees to approximately 95 degrees. Optionally, the included angle between any two adjacent edges of substantially all edges of a boundary of each of the plurality of dummy patterns is substantially 90 degrees.

In some embodiments, an included angle between each of substantially all edges of the boundary of each of the plurality of dummy patterns and the first direction is in a range of approximately 15 degrees to approximately 75 degrees; and an included angle between each of substantially all edges of the boundary of each of the plurality of dummy patterns and the second direction is in a range of approximately 15 degrees to approximately 75 degrees. Referring to FIG. 3, an included angle $\theta 1$ between edge f3 and the first direction is between approximately 15 degrees to approximately 75 degrees, an included angle $\theta 2$ between edge f4 and the first direction is between approximately 15 degrees to approximately 75 degrees, an included angle $\varphi 1$ between edge f2 and the second direction is between approximately 15 degrees to approximately 75 degrees, and an included angle $\varphi 2$ between edge f1 and the second direction is between approximately 15 degrees to approximately 75 degrees.

Optionally, the included angle between each of substantially all edges of the boundary of each of the plurality of dummy patterns and the first direction is in a range of approximately 25 degrees to approximately 65 degrees; and the included angle between each of substantially all edges of the boundary of each of the plurality of dummy patterns and the second direction is in a range of approximately 25 degrees to approximately 65 degrees. Optionally, the included angle between each of substantially all edges of the boundary of each of the plurality of dummy patterns and the first direction is in a range of approximately 30 degrees to approximately 60 degrees; and the included angle between each of substantially all edges of the boundary of each of the plurality of dummy patterns and the second direction is in a range of approximately 30 degrees to approximately 60 degrees. Optionally, the included angle between each of substantially all edges of the boundary of each of the plurality of dummy patterns and the first direction is in a range of approximately 35 degrees to approximately 55 degrees; and the included angle between each of substantially all edges of the boundary of each of the plurality of dummy patterns and the second direction is in a range of approximately 35 degrees to approximately 55 degrees. Optionally, the included angle between each of substantially all edges of the boundary of each of the plurality of dummy patterns and the first direction is in a range of approximately 40 degrees to approximately 50 degrees; and the included angle between each of substantially all edges of the boundary of each of the plurality of dummy patterns and the second direction is in a range of approximately 40 degrees to approximately 50 degrees. Optionally, the included angle between each of substantially all edges of the boundary of each of the plurality of dummy patterns and the first direction is in a range of approximately 42.5 degrees to approximately 47.5 degrees; and the included angle between each of substantially all edges of the boundary of each of the plurality of dummy patterns and the second direction is in a range of approximately 42.5 degrees to approximately 47.5 degrees. Optionally, the included angle between each of substantially all edges of the boundary of each of the plurality of dummy patterns and the first direction is substantially 45 degrees; and the included angle between each of substantially all edges of the boundary of each of the plurality of dummy patterns and the second direction is approximately 45 degrees.

In some embodiment, the touch substrate further includes a black matrix layer having a plurality of black matrices substantially along a third direction and a plurality of black matrices substantially along a fourth direction. Optionally, the first direction is substantially parallel to the third direction, and the second direction is substantially parallel to the fourth direction.

In some embodiments, the touch substrate is a touch substrate in a display apparatus having an array of a plurality of subpixels arranged in an array substantially along a third direction and a fourth direction. Optionally, the first direction is substantially parallel to the third direction, and the second direction is substantially parallel to the fourth direction.

By having the included angle between any two adjacent edges of substantially all edges of a boundary of each of the plurality of dummy patterns in the range of approximately 30 degrees to approximately 150 degrees, the included angle between each of substantially all edges of the boundary of each of the plurality of dummy patterns and the first direction in the range of approximately 15 degrees to approximately 75 degrees, and the included angle between each of substantially all edges of the boundary of each of the plurality of dummy patterns and the second direction in the range of approximately 15 degrees to approximately 75 degrees, interference between the touch electrode pattern and the pattern of a plurality of subpixels in a display apparatus having the touch substrate can be further reduced, obviating the interference with the display module and the Moiré pattern.

Figure 4:
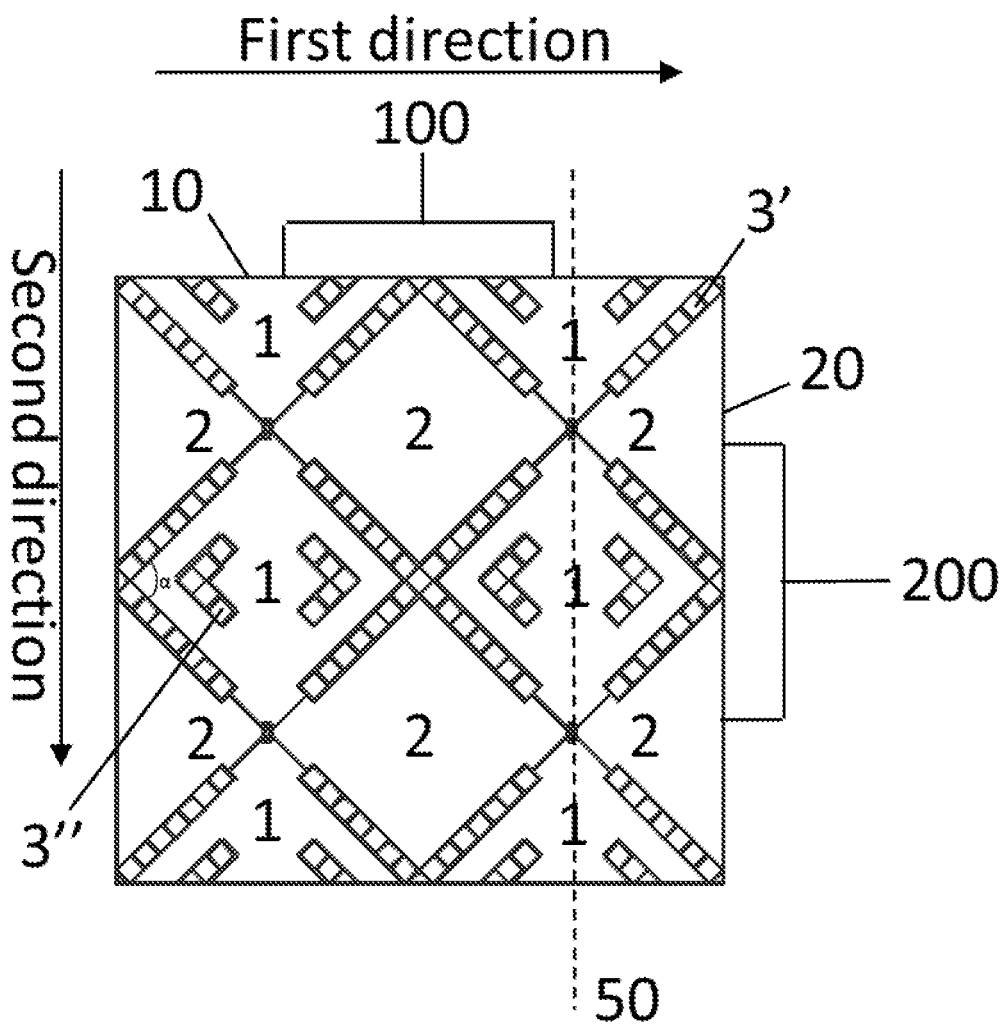
FIG. 4 is a diagram illustrating a touch substrate in some embodiments according to the present disclosure.

FIG. 4 is a diagram illustrating a touch substrate in some embodiments according to the present disclosure. Referring to FIG. 4, the touch substrate in some embodiments further includes a second touch electrode layer having a plurality of second touch electrodes 20 arranged successively along the second direction. Each of the plurality of second touch electrodes 20 extends substantially along the first direction. Each of the plurality of second touch electrodes 20 includes a plurality of second electrode blocks 2 electrically connected substantially along the first direction. Optionally, each of the plurality of first touch electrode blocks 1 has a first zigzag boundary having a plurality of rising edges and a plurality of falling edges, and each of the plurality of second touch electrode blocks 2 has a second zigzag boundary having a plurality of rising edges and a plurality of falling edges.

In some embodiments, an included angle between any two adjacent edges of substantially all edges of the second zigzag boundary is in a range of approximately 30 degrees to approximately 150 degrees. Optionally, the included angle between any two adjacent edges of substantially all edges of the second zigzag boundary is in a range of approximately 50 degrees to approximately 130 degrees. Optionally, the included angle between any two adjacent edges of substantially all edges of the second zigzag boundary is in a range of approximately 60 degrees to approximately 120 degrees. Optionally, the included angle between any two adjacent edges of substantially all edges of the second zigzag boundary is in a range of approximately 70 degrees to approximately 110 degrees. Optionally, the included angle between any two adjacent edges of substantially all edges of the second zigzag boundary is in a range of approximately 80 degrees to approximately 100 degrees. Optionally, the included angle between any two adjacent edges of substantially all edges of the second zigzag boundary is in a range of approximately 85 degrees to approximately 95 degrees. Optionally, the included angle between any two adjacent edges of substantially all edges of the second zigzag boundary is substantially 90 degrees.

In some embodiments, an included angle between each of substantially all edges of the second zigzag boundary and the first direction is in a range of approximately 15 degrees to approximately 75 degrees; and an included angle between each of substantially all edges of the second zigzag boundary and the second direction is in a range of approximately 15 degrees to approximately 75 degrees. Optionally, the included angle between each of substantially all edges of the second zigzag boundary and the first direction is in a range of approximately 25 degrees to approximately 65 degrees; and the included angle between each of substantially all edges of the second zigzag boundary and the second direction is in a range of approximately 25 degrees to approximately 65 degrees. Optionally, the included angle between each of substantially all edges of the second zigzag boundary and the first direction is in a range of approximately 30 degrees to approximately 60 degrees; and the included angle between each of substantially all edges of the second zigzag boundary and the second direction is in a range of approximately 30 degrees to approximately 60 degrees. Optionally, the included angle between each of substantially all edges of the second zigzag boundary and the first direction is in a range of approximately 35 degrees to approximately 55 degrees; and the included angle between each of substantially all edges of the second zigzag boundary and the second direction is in a range of approximately 35 degrees to approximately 55 degrees. Optionally, the included angle between each of substantially all edges of the second zigzag boundary and the first direction is in a range of approximately 40 degrees to approximately 50 degrees; and the included angle between each of substantially all edges of the second zigzag boundary and the second direction is in a range of approximately 40 degrees to approximately 50 degrees. Optionally, the included angle between each of substantially all edges of the second zigzag boundary and the first direction is in a range of approximately 42.5 degrees to approximately 47.5 degrees; and the included angle between each of substantially all edges of the second zigzag boundary and the second direction is in a range of approximately 42.5 degrees to approximately 47.5 degrees. Optionally, the included angle between each of substantially all edges of the second zigzag boundary and the first direction is substantially 45 degrees; and the included angle between each of substantially all edges of the second zigzag boundary and the second direction is approximately 45 degrees.

Optionally, the second touch electrode layer is a touch scanning electrode layer. Optionally, the second touch electrode layer is a touch sensing electrode layer.

Optionally, the touch substrate is a mutual-capacitive type touch substrate including the first touch electrode layer and the second touch electrode layer.

By having the included angle between any two adjacent edges of substantially all edges of the second zigzag boundary in the range of approximately 30 degrees to approximately 150 degrees, the included angle between each of substantially all edges of the second zigzag boundary and the first direction in the range of approximately 15 degrees to approximately 75 degrees, and the included angle between each of substantially all edges of the second zigzag boundary and the second direction in the range of approximately 15 degrees to approximately 75 degrees, interference between the touch electrode pattern and the pattern of a plurality of subpixels in a display apparatus having the touch substrate can be further reduced, obviating the interference with the display module and the Moiré pattern.

Referring to FIG. 1, the plurality of first touch electrodes 10 and the plurality of second touch electrodes 20 cross over each other, forming a plurality of intersections 40. Optionally, adjacent first touch electrode blocks in each of the plurality of first touch electrodes 10 are spaced apart from each other at one of the plurality of intersections 40. In some embodiments, the touch substrate in some embodiments further includes a first bridge layer including a plurality of first bridges 1a, the adjacent first touch electrode blocks in each of the plurality of first touch electrodes 10 are electrically connected to each other through one of the plurality of first bridges 1a. Each of the plurality of first bridges 1a is electrically connected two adjacent first electrode blocks of the plurality of first electrode blocks 1 in each of the plurality of first touch electrodes 10. Optionally, the first bridge layer and the first touch electrode layer are in two different layers. Optionally, the first bridge layer and the first touch electrode layer are in a same layer, e.g., made of a same material and patterned in a same process using a same mask plate.

Optionally, adjacent second touch electrode blocks in each of the plurality of second touch electrodes 20 are spaced apart from each other at one of the plurality of intersections 40. In some embodiments, the touch substrate in some embodiments further includes a second bridge layer including a plurality of second bridges 2a, the adjacent second touch electrode blocks in each of the plurality of second touch electrodes 20 are electrically connected to each other through one of the plurality of second bridges 2a. Each of the plurality of second bridges 2a is electrically connected two adjacent second electrode blocks of the plurality of second electrode blocks 2 in each of the plurality of second touch electrodes 20. Optionally, the second bridge layer and the second touch electrode layer are in two different layers. Optionally, the second bridge layer and the second touch electrode layer are in a same layer, e.g., made of a same material and patterned in a same process using a same mask plate.

Optionally, the first touch electrode layer and the second touch electrode layer are in a same layer, e.g., made of a same material and patterned in a same process using a same mask plate. Optionally, the first touch electrode layer and the second touch electrode layer are in two different layers.

Referring to FIG. 4, the touch substrate in some embodiments includes a plurality of first dummy patterns 3' and a plurality of second dummy patterns 3". Each of the plurality of first dummy patterns 3' is in an area between two adjacent electrode blocks (e.g., between one of the plurality of first electrode blocks 1 and one of the plurality of second electrode blocks 2). Each of the plurality of second dummy patterns 3" is in an area surrounded by a single touch electrode block (e.g., by one of the plurality of first electrode blocks 1). By having this design, an area of the touch electrode (e.g., a total area of the touch sensing electrode) can be further reduced, touch signals can be more discernible from noise signals.

Optionally, a plurality of second dummy patterns 3" surrounded by a single one of the plurality of first electrode blocks 1 have a substantially mirror symmetry with respect to an axis of mirror symmetry 50 substantially along the second direction. Optionally, the single one of the plurality of first electrode blocks 1 also has a substantially mirror symmetry with respect to the axis of mirror symmetry 50.

Figure 5:
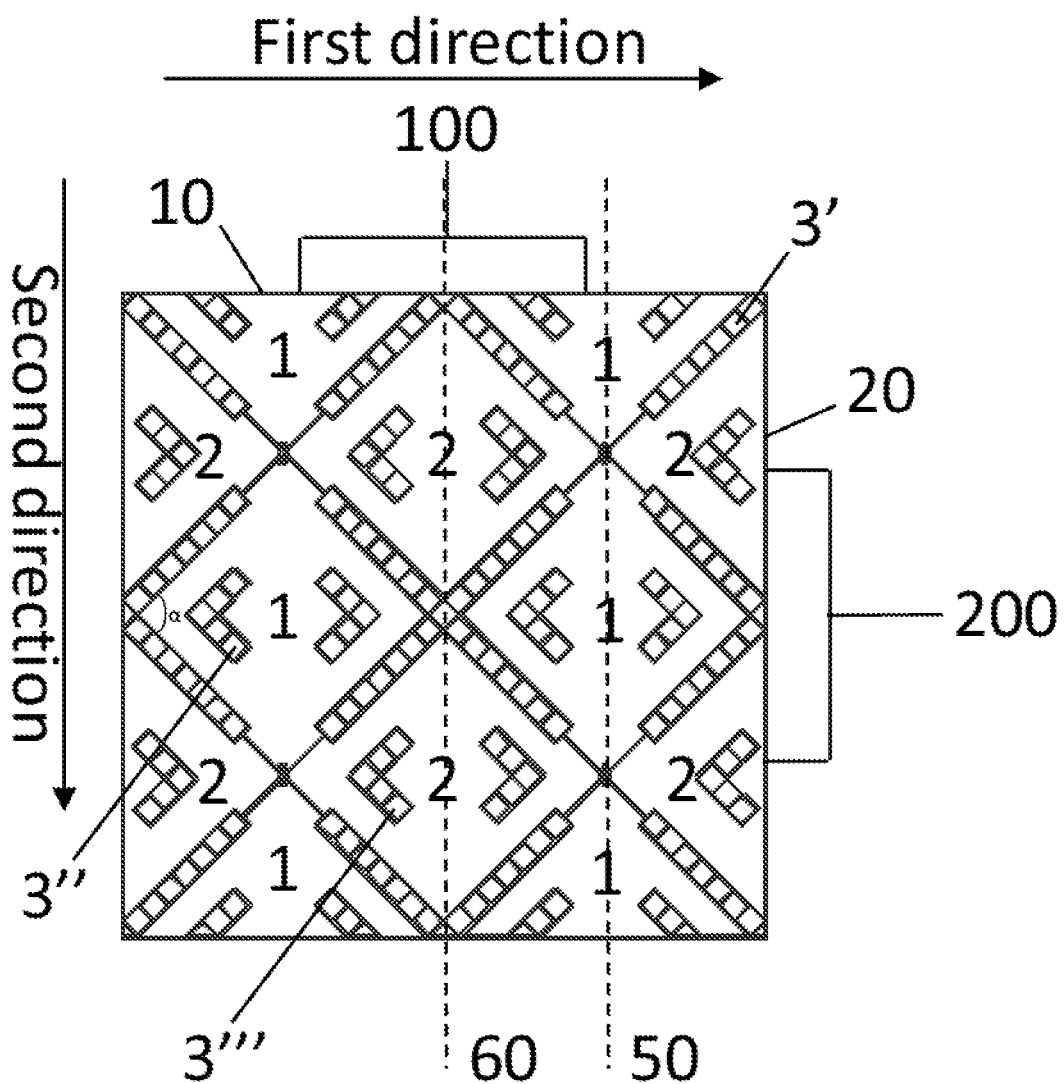
FIG. 5 is a diagram illustrating a touch substrate in some embodiments according to the present disclosure.

FIG. 5 is a diagram illustrating a touch substrate in some embodiments according to the present disclosure. Referring to FIG. 5, the touch substrate in some embodiments includes a plurality of first dummy patterns 3', a plurality of second dummy patterns 3", and a plurality of third dummy patterns 3'''. Each of the plurality of first dummy patterns 3' is in an area between one of the plurality of first touch electrode blocks 1 and one of the plurality of second touch electrode blocks 2. Each of the plurality of second dummy patterns 3" is in an area surrounded by one of the plurality of first electrode blocks 1. Each of the plurality of third dummy patterns 3''' is in an area surrounded by one of the plurality of second electrode blocks 2.

Optionally, a plurality of second dummy patterns 3" surrounded by a single one of the plurality of first electrode blocks 1 have a substantially mirror symmetry with respect to an axis of mirror symmetry 50 substantially along the second direction. Optionally, the single one of the plurality of first electrode blocks 1 also has a substantially mirror symmetry with respect to the axis of mirror symmetry 50. Optionally, a plurality of third dummy patterns 3''' surrounded by a single one of the plurality of second electrode blocks 2 have a substantially mirror symmetry with respect to an axis of mirror symmetry 60 substantially along the second direction. Optionally, the single one of the plurality of second electrode blocks 2 also has a substantially mirror symmetry with respect to the axis of mirror symmetry 60.

Optionally, a ratio between a total area of the plurality of dummy patterns and a total area of touch electrodes in the touch substrate is in a range of approximately 1:10 to approximately 1:2. Optionally, a ratio between a total area of the plurality of dummy patterns and a total area of the first touch electrode layer and the second touch electrode layer is in a range of approximately 1:10 to 1:2. In one example, and referring to FIG. 5, a total area of the plurality of first dummy patterns 3', the plurality of second dummy patterns 3", and the plurality of third dummy patterns 3''' has a ratio with a total area of the plurality of first touch electrode blocks 1 and the plurality of second touch electrode blocks 2 in a range of approximately 1:10 to approximately 1:2.

Figure 6:
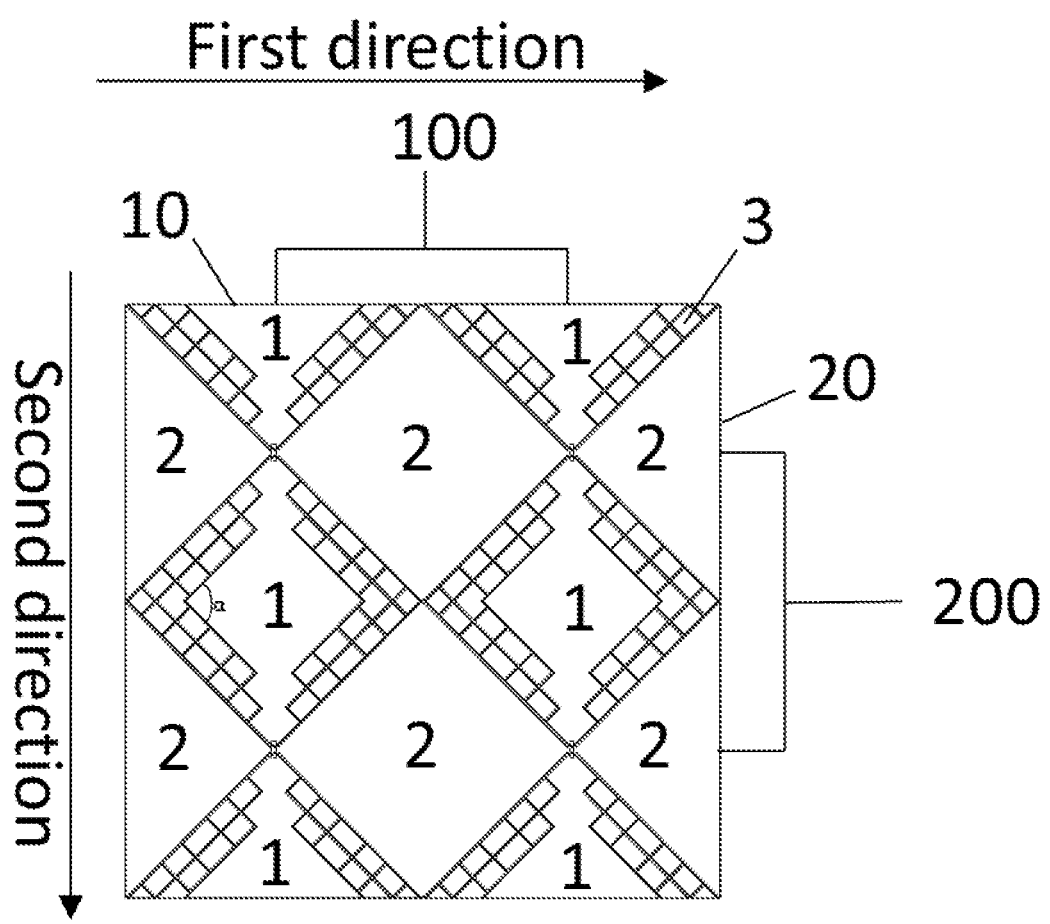
FIG. 6 is a diagram illustrating a touch substrate in some embodiments according to the present disclosure.

FIG. 6 is a diagram illustrating a touch substrate in some embodiments according to the present disclosure. Referring to FIG. 6, the dummy patterns in some embodiments are mosaic dummy patterns including many small dummy blocks. By having mosaic dummy patterns, optical interference between boundaries of the touch electrodes can be further reduced, achieving an excellent blanking effect.

Referring to FIGS. 1, and 4 to 6, the touch substrate in some embodiments further includes a plurality of first touch signal lines 100 and a plurality of second touch signal lines 200. In some embodiments, each of the plurality of first touch signal lines 100 is electrically connected to two or more (e.g., 2, 3, 4, or more) of the plurality of first touch electrodes 10 in parallel. In some embodiments, each of the plurality of second touch signal lines 200 is electrically connected to two or more (e.g., 2, 3, 4, or more) of the plurality of second touch electrodes 20 in parallel.

Figure 7A:
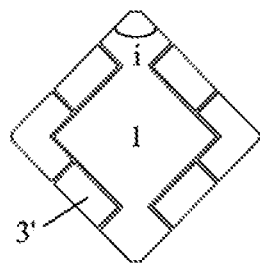
FIGS. 7A to 7D are diagrams illustrating portions of touch substrates in some embodiments according to the present disclosure.
Figure 7B:
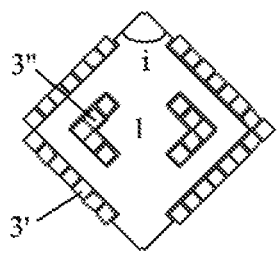
Figure 7C:
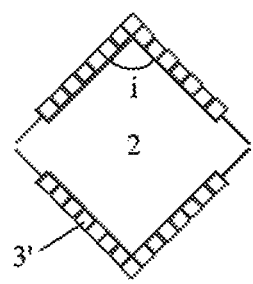
Figure 7D:
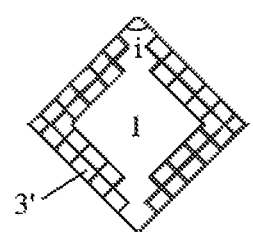

In some embodiments, each of the plurality of first touch electrode blocks and adjacent dummy patterns of the plurality of dummy patterns form a substantially parallelogram shape. FIGS. 7A to 7D are diagrams illustrating portions of touch substrates in some embodiments according to the present disclosure. FIG. 7A depicts a portion of the touch substrate as shown in FIG. 1. In FIG. 7A, each of the plurality of first touch electrode blocks 1 and adjacent dummy patterns of the plurality of first dummy patterns 3' form a substantially parallelogram shape. The substantially parallelogram shape has an interior angle i in a range of approximately 60 degrees to approximately 90 degrees. Referring to FIG. 1, in some embodiments, each of the plurality of second touch electrodes 2 has a substantially parallelogram shape. Similarly, the substantially parallelogram shape of each of the plurality of second touch electrodes 2 has an interior angle in a range of approximately 60 degrees to approximately 90 degrees. FIG. 7B depicts a portion of the touch substrate as shown in FIG. 4. In FIG. 7B, each of the plurality of first touch electrode blocks 1 and adjacent dummy patterns of the plurality of first dummy patterns 3' and adjacent dummy patterns of the plurality of second dummy patterns 3" form a substantially parallelogram shape. The substantially parallelogram shape has an interior angle i in a range of approximately 60 degrees to approximately 90 degrees. FIG. 7C depicts a portion of the touch substrate as shown in FIG. 4. In FIG. 7C, each of the plurality of first touch electrode blocks 2 and adjacent dummy patterns of the plurality of first dummy patterns 3' form a substantially parallelogram shape. The substantially parallelogram shape has an interior angle i in a range of approximately 60 degrees to approximately 90 degrees. FIG. 7D depicts a portion of the touch substrate as shown in FIG. 6. In FIG. 7D, each of the plurality of first touch electrode blocks 1 and adjacent dummy patterns of the plurality of first dummy patterns 3' form a substantially parallelogram shape. The substantially parallelogram shape has an interior angle i in a range of approximately 60 degrees to approximately 90 degrees. Referring to FIG. 6, in some embodiments, each of the plurality of second touch electrodes 2 has a substantially parallelogram shape. The substantially parallelogram shape of each of the plurality of second touch electrodes 2 has an interior angle in a range of approximately 60 degrees to approximately 90 degrees.

Optionally, an interior angle of the substantially parallelogram shape between the two sides of the parallelogram is in a range of approximately 60 degrees to approximately 90 degrees, e.g., approximately 60 degrees to approximately 89 degrees, approximately 60 degrees to approximately 80 degrees, approximately 70 degrees to approximately 90 degrees, approximately 70 degrees to approximately 80 degrees.

Figure 8:
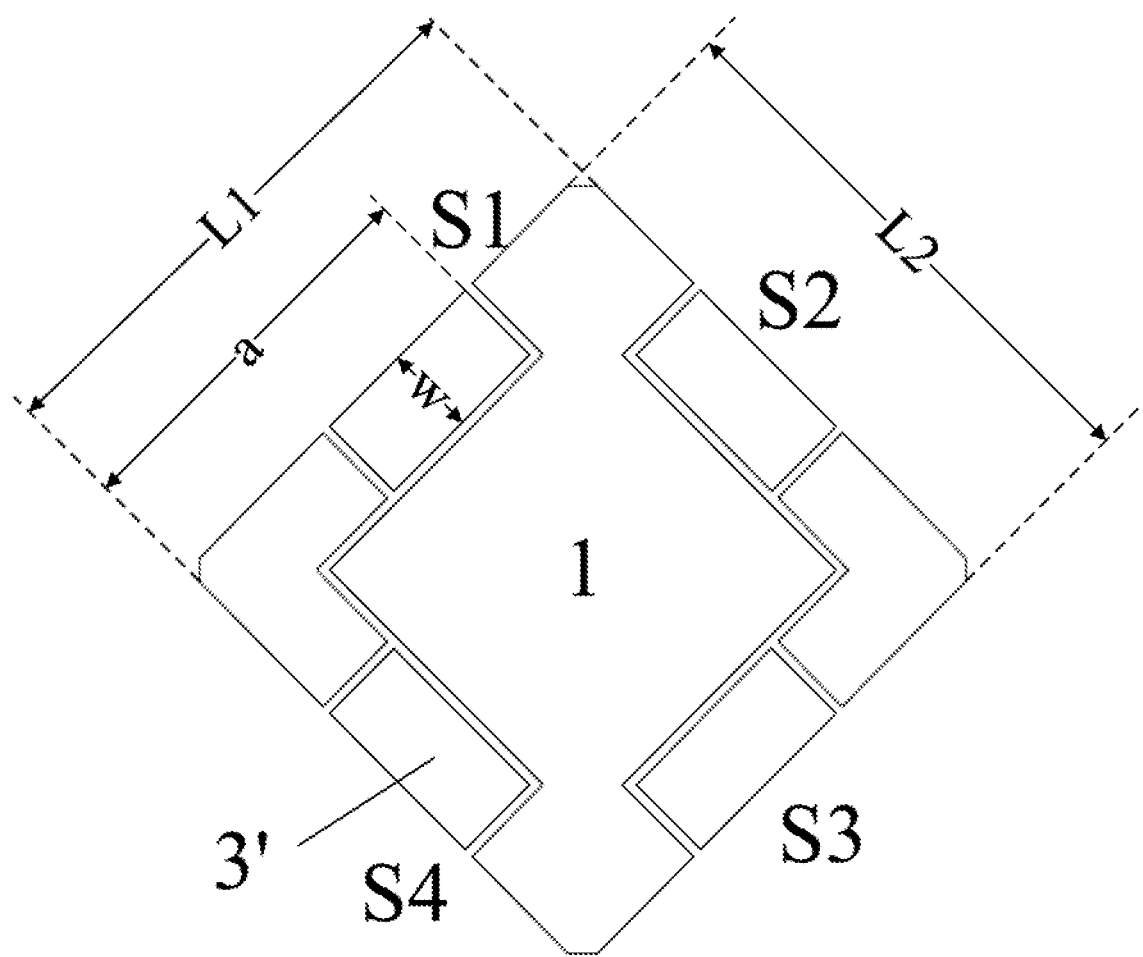
FIG. 8 is a diagram illustrating a portion of a touch substrate in some embodiments according to the present disclosure.

In some embodiments, the plurality of dummy patterns includes a plurality of first dummy patterns 3', each of which being in an area sandwiched between a pair of one of the plurality of first electrode blocks 1 and one of the plurality of second electrode blocks 2, the one of the plurality of first electrode blocks 1 and the one of the plurality of second electrode blocks 2 adjacent to each other. FIG. 8 is a diagram illustrating a portion of a touch substrate in some embodiments according to the present disclosure. Referring to FIG. 8, the substantially parallelogram shape formed by one of the plurality of first touch electrode blocks 1 and adjacent dummy patterns of the plurality of first dummy patterns 3' has four sides, S1 to S4. Along each of the first side S1 to the fourth side S4, the one or more of the plurality of first dummy patterns 3' occupies a length a. The first side S1 has a length L1. Optionally, the length a is approximately 50% to approximately 75% (e.g., approximately 50% to approximately 62.5%, approximately 62.5% to approximately 75%) of the length L1 of the first side. Optionally, the one or more of the plurality of first dummy patterns occupies between approximately 50% to approximately 75% (e.g., approximately 50% to approximately 62.5%, approximately 62.5% to approximately 75%) of a length of a side in each of at least one of four sides of the substantially parallelogram shape, as shown in FIG. 8.

Referring to FIG. 8 and FIG. 1, each of the one or more of the plurality of first dummy patterns 3' occupying a portion of the first side S1 has a width w along a width direction between the pair of the one of the plurality of first electrode blocks 1 and the one of the plurality of second electrode blocks 2. In some embodiments, the width w of each of the plurality of first dummy patterns 3' along the width direction between the pair of the one of the plurality of first electrode blocks 1 and the one of the plurality of second electrode blocks 2 is no more than approximately 25% (e.g., no more than 12.5%, between 12.5% and 25%) of a length L2 of a side of the substantially parallelogram shape substantially parallel to the width direction.

Figure 9:
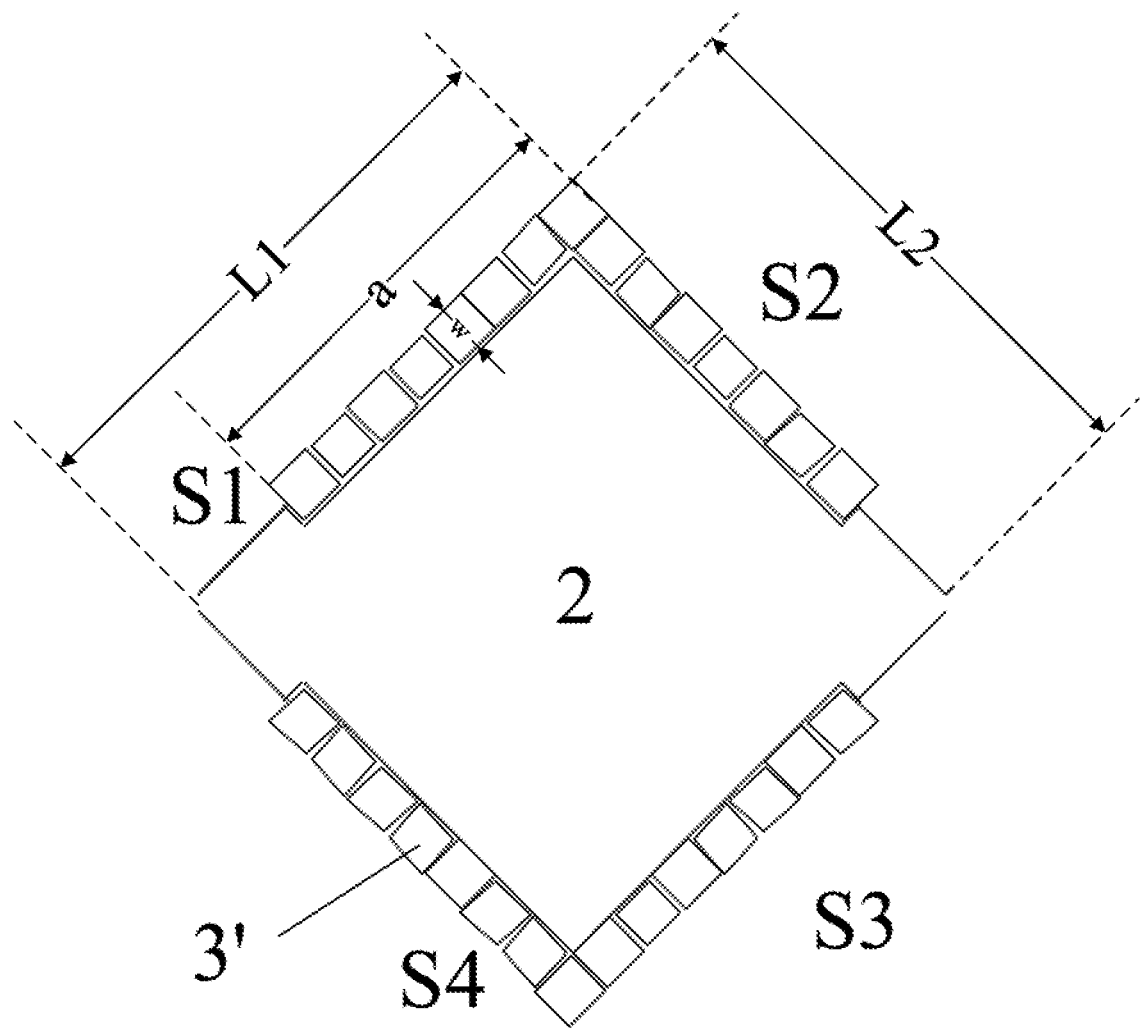
FIG. 9 is a diagram illustrating a portion of a touch substrate in some embodiments according to the present disclosure.

FIG. 9 is a diagram illustrating a portion of a touch substrate in some embodiments according to the present disclosure. Referring to FIG. 9, the substantially parallelogram shape formed by one of the plurality of second touch electrode blocks 2 and adjacent dummy patterns of the plurality of first dummy patterns 3' has four sides, S1 to S4. Along each of the first side S1 to the fourth side S4, the one or more of the plurality of first dummy patterns 3' occupies a length a. The first side S1 has a length L1. Optionally, the length a is approximately 50% to approximately 75% (e.g., approximately 50% to approximately 62.5%, approximately 62.5% to approximately 75%) of the length L1 of the first side. Optionally, the one or more of the plurality of first dummy patterns occupies between approximately 50% to approximately 75% (e.g., approximately 50% to approximately 62.5%, approximately 62.5% to approximately 75%) of a length of a side in each of at least one of four sides of the substantially parallelogram shape, as shown in FIG. 9.

Referring to FIG. 9 and FIG. 4, each of the one or more of the plurality of first dummy patterns 3' occupies a portion of the first side S1 has a width w along a width direction between the pair of the one of the plurality of first electrode blocks 1 and the one of the plurality of second electrode blocks 2. In some embodiments, the width w of each of the plurality of first dummy patterns 3' along the width direction between the pair of the one of the plurality of first electrode blocks 1 and the one of the plurality of second electrode blocks 2 is no more than approximately 25% (e.g., no more than 12.5%, between 12.5% and 25%) of a length L2 of a side of the substantially parallelogram shape substantially parallel to the width direction.

Figure 10:
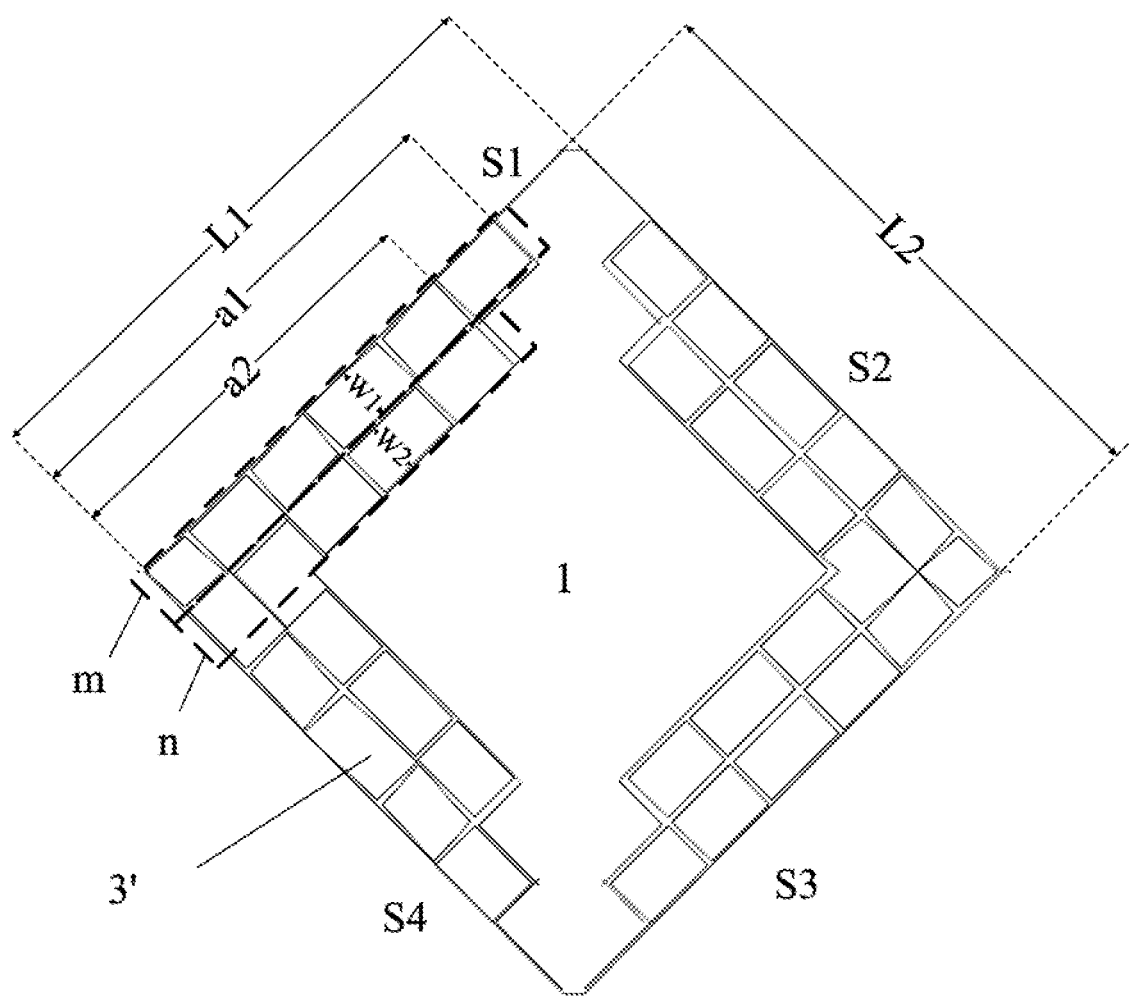
FIG. 10 is a diagram illustrating a portion of a touch substrate in some embodiments according to the present disclosure.

FIG. 10 is a diagram illustrating a portion of a touch substrate in some embodiments according to the present disclosure. Referring to FIG. 10, multiple dummy patterns of the plurality of first dummy patterns 3' occupying a first side S1 of the substantially parallelogram shape includes a first layer m of dummy patterns and a second layer n of dummy patterns. The first layer m of dummy patterns extends along the first side S1 of the substantially parallelogram shape for a first length a1. The second layer n of dummy patterns is adjacent to the first layer m of dummy patterns. The second layer n of dummy patterns is spaced apart from the first side S1 of the substantially parallelogram shape by the first layer of dummy patterns m. The second layer n of dummy patterns extends along the first layer m of dummy patterns for a second length a2, e.g., along a direction substantially parallel to the first side S1 of the substantially parallelogram shape.

Optionally, the multiple dummy patterns of the plurality of first dummy patterns 3' occupying a first side S1 of the substantially parallelogram shape include more than two layers of dummy patterns.

In some embodiments, a first ratio of the first length a1 to a length L1 of the first side S1 is substantially the same as a second ratio of the second length a2 to the first length a1. Optionally, each of the first ratio and the second ratio is in a range of approximately 1:2 to approximately 3:4, e.g., approximately 1:2 to approximately 5:8, and approximately 5:8 to approximately 3:4.

Referring to FIG. 10 and FIG. 6, each of the one or more of the plurality of first dummy patterns 3' in the first layer m of dummy patterns has a width w1 along a width direction between the pair of the one of the plurality of first electrode blocks 1 and the one of the plurality of second electrode blocks 2; and each of the one or more of the plurality of first dummy patterns 3' in the second layer n of dummy patterns has a width w2 along the width direction between the pair of the one of the plurality of first electrode blocks 1 and the one of the plurality of second electrode blocks 2. In some embodiments, the width w1 of each of the plurality of first dummy patterns 3' in the first layer m of dummy patterns along the width direction between the pair of the one of the plurality of first electrode blocks 1 and the one of the plurality of second electrode blocks 2 is no more than approximately 25% (e.g., no more than 12.5%, between 12.5% and 25%) of a length L2 of a side of the substantially parallelogram shape substantially parallel to the width direction. In some embodiments, the width w2 of each of the plurality of first dummy patterns 3' in the second layer n of dummy patterns along the width direction between the pair of the one of the plurality of first electrode blocks 1 and the one of the plurality of second electrode blocks 2 is no more than approximately 25% (e.g., no more than 12.5%, between 12.5% and 25%) of a length L2 of a side of the substantially parallelogram shape substantially parallel to the width direction. In some embodiments, a sum of the width w1 and the width w2 is no more than approximately 50% (e.g., no more than 12.5%, between 12.5% and 25%, between 25% and 37.5%, between 37.5% and 50%) of the length L2.

In another aspect, the present disclosure provides a touch control display panel having a touch substrate described herein.

In another aspect, the present disclosure provides a touch control display apparatus having a touch substrate described herein. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
   a first touch electrode layer comprising a plurality of first touch electrodes successively along a first direction, each of the plurality of first touch electrodes extending substantially along a second direction;
   a second touch electrode layer comprising a plurality of second touch electrodes successively along the second direction, each of the plurality of second touch electrodes extending substantially along the first direction; and
   a plurality of dummy patterns electrically insulated from the first touch electrode layer;
   wherein each of the plurality of first touch electrodes comprises a plurality of first electrode blocks electrically connected substantially along the second direction;
   each of the plurality of second touch electrodes comprises a plurality of second electrode blocks electrically connected substantially along the first direction;
   each of the plurality of first touch electrode blocks has a first zigzag boundary having a plurality of rising edges and a plurality of falling edges;
   each of the plurality of first touch electrode blocks and adjacent dummy patterns of the plurality of dummy patterns form a substantially parallelogram shape;
   each of the plurality of second touch electrode blocks has a second zigzag boundary having a plurality of rising edges and a plurality of falling edges; and
   each of the plurality of second touch electrode blocks and adjacent dummy patterns of the plurality of dummy patterns form a substantially parallelogram shape.

2. The touch substrate of claim 1, wherein an interior angle of the parallelogram shape is in a range of approximately 60 degrees to approximately 90 degrees.

3. The touch substrate of claim 1, wherein each of the plurality of second touch electrodes has a substantially parallelogram shape.

4. The touch substrate of claim 3, wherein an included angle between each of substantially all edges of the boundary of each of the plurality of dummy patterns and the first direction is in a range of approximately 15 degrees to approximately 75 degrees; and
   an included angle between each of substantially all edges of the boundary of each of the plurality of dummy patterns and the second direction is in a range of approximately 15 degrees to approximately 75 degrees.

5. The touch substrate of claim 1, wherein the plurality of dummy patterns comprises a plurality of first dummy patterns, each of which being in an area sandwiched between a pair of one of the plurality of first electrode blocks and one of the plurality of second electrode blocks, the one of the plurality of first electrode blocks and the one of the plurality of second electrode blocks being adjacent to each other.

6. The touch substrate of claim 5, wherein one or more of the plurality of first dummy patterns occupies between approximately 50% to approximately 75% of a length of a side in each of at least one of four sides of the substantially parallelogram shape.

7. The touch substrate of claim 5, wherein a width of each of the plurality of first dummy patterns along a width direction between the pair of the one of the plurality of first electrode blocks and the one of the plurality of second electrode blocks is no more than approximately 25% of a length of a side of the substantially parallelogram shape substantially parallel to the width direction.

8. The touch substrate of claim 5, wherein multiple dummy patterns of the plurality of first dummy patterns occupying a first side of the substantially parallelogram shape comprise a first layer of dummy patterns and a second layer of dummy patterns;

the first layer of dummy patterns extends along the first side of the substantially parallelogram shape for a first length; and the second layer of dummy patterns is adjacent to the first layer of dummy patterns and is spaced apart from the first side of the substantially parallelogram shape by the first layer of dummy patterns, the second layer of dummy patterns extends along the first layer of dummy patterns for a second length.

9. The touch substrate of claim 8, wherein a first ratio of the first length to a length of the first side is substantially the same as a second ratio of the second length to the first length.

10. The touch substrate of claim 5, wherein the plurality of dummy patterns further comprises a plurality of second dummy patterns, each of which being in an area surrounded by one of the plurality of first electrode blocks.

11. The touch substrate of claim 10, multiple second dummy patterns of the plurality of second dummy patterns surrounded by a single one of the plurality of first electrode blocks have a substantially mirror symmetry with respect to an axis of mirror symmetry substantially along the second direction.

12. The touch substrate of claim 11, wherein the single one of the plurality of first electrode block has a substantially mirror symmetry with respect to the axis of mirror symmetry.

13. The touch substrate of claim 1, wherein an included angle between each of substantially all edges of the first zigzag boundary and the first direction is in a range of approximately 15 degrees to approximately 75 degrees; and an included angle between each of substantially all edges of the first zigzag boundary and the second direction is in a range of approximately 15 degrees to approximately 75 degrees.

14. The touch substrate of claim 1, wherein an included angle between any two adjacent edges of substantially all edges of a boundary of each of the plurality of dummy patterns is in a range of approximately 30 degrees to approximately 150 degrees.

15. The touch substrate of claim 1, wherein a ratio between a total area of the plurality of dummy patterns and a total area of touch electrodes in the touch substrate is in a range of approximately 1:10 to approximately 1:2.

16. The touch substrate of claim 1, wherein
an included angle between any two adjacent edges of substantially all edges of the second zigzag boundary is in a range of approximately 30 degrees to approximately 150 degrees.

17. The touch substrate of claim 16, wherein an included angle between each of substantially all edges of the second zigzag boundary and the first direction is in a range of approximately 15 degrees to approximately 75 degrees; and an included angle between each of substantially all edges of the second zigzag boundary and the second direction is in a range of approximately 15 degrees to approximately 75 degrees.

18. A touch control display apparatus, comprising the touch substrate of claim 1; and an array of a plurality of subpixels in a matrix substantially along the first direction and the second direction.

19. A touch substrate, comprising:

a first touch electrode layer comprising a plurality of first touch electrodes successively along a first direction, each of the plurality of first touch electrodes extending substantially along a second direction;

a second touch electrode layer comprising a plurality of second touch electrodes successively along the second direction, each of the plurality of second touch electrodes extending substantially along the first direction; and a plurality of dummy patterns electrically insulated from the first touch electrode layer;

wherein each of the plurality of first touch electrodes comprises a plurality of first electrode blocks electrically connected substantially along the second direction;

each of the plurality of second touch electrodes comprises a plurality of second electrode blocks electrically connected substantially along the first direction;

each of the plurality of first touch electrode blocks has a first zigzag boundary having a plurality of rising edges and a plurality of falling edges; and each of the plurality of first touch electrode blocks and adjacent dummy patterns of the plurality of dummy patterns form a substantially parallelogram shape;

wherein the plurality of dummy patterns comprises a plurality of first dummy patterns, each of which being in an area sandwiched between a pair of one of the plurality of first electrode blocks and one of the plurality of second electrode blocks, the one of the plurality of first electrode blocks and the one of the plurality of second electrode blocks being adjacent to each other; and the plurality of dummy patterns further comprises a plurality of third dummy patterns, each of which being in an area surrounded by one of the plurality of second electrode blocks.

* * * * *